US000001050H

United States Statutory Invention Registration [19]

[11] Reg. Number: H1050

Petrillo

[43] Published: May 5, 1992

[54] WRITING INSTRUMENT

[75] Inventor: Richard J. Petrillo, Norwell, Mass.

[73] Assignee: The Gillette Company, Boston, Mass.

[21] Appl. No.: 608,214

[22] Filed: Nov. 2, 1990

[51] Int. Cl.[5] ..... A46B 5/02
[52] U.S. Cl. ..... 401/6; 401/88
[58] Field of Search ..... 401/6, 88, 91

[56] References Cited

U.S. PATENT DOCUMENTS

| | | | |
|---|---|---|---|
| 770,363 | 9/1904 | Goldsmith | 401/6 X |
| 1,421,535 | 7/1922 | Murdock | 401/88 |
| 1,807,415 | 5/1931 | La France . | |
| 2,173,451 | 9/1939 | Lorber . | |
| 2,180,560 | 11/1939 | Stempel . | |
| 2,236,194 | 3/1941 | Lorber . | |
| 2,968,849 | 1/1961 | Cain | 401/6 X |
| 4,035,089 | 7/1977 | Schwartz et al. | 401/6 |
| 4,167,347 | 9/1979 | Hoyle | 401/88 |
| 4,601,598 | 7/1986 | Schwartz et al. | 401/6 |
| 4,932,800 | 6/1990 | Nan et al. | 401/6 |

FOREIGN PATENT DOCUMENTS

| | | | |
|---|---|---|---|
| 546632 | 3/1932 | Fed. Rep. of Germany | 401/6 |
| 1511325 | 7/1969 | Fed. Rep. of Germany . | |
| 2157175 | 5/1973 | Fed. Rep. of Germany | 401/6 |
| 3406522 | 9/1985 | Fed. Rep. of Germany | 401/6 |
| WO88/00002 | 7/1988 | PCT Int'l Appl. . | |
| 568846 | 4/1945 | United Kingdom | 401/6 |

*Primary Examiner*—Michael J. Carone
*Attorney, Agent, or Firm*—Donal B. Tobin; Owen J. Meegan; Aubrey C. Brine

[57] ABSTRACT

A writing instrument is provided with a manual gripping device adjacent the writing point which comprises a resilient finger gripping portion of the assembly having a tubular sleeve enveloping the resilient portion. The resilient portion comprises an elongated tube, and a plurality of elongated slots formed therein extending axially with respect to the writing instrument barrel assembly over substantially the length of the resilient portion. The resilient portion may be a portion of the writing instrument barrel assembly, or the resilient portion and sleeve may be in the form of a separate unit which is installed over the barrel assembly.

15 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WRITING INSTRUMENT

BACKGROUND OF THE INVENTION

The present invention relates to an improved finger gripping device for use on a writing instrument or the like and more particularly to a finger gripping device which provides improved ease of manipulation of an article employing the device.

Presently, there are a number of known devices which are intended to provide a comfortable finger gripping area for finger manipulated articles, one such device being that disclosed in U.S. Pat. No. 4,932,800 issued Jun. 12, 1990 and assigned to the assignee of the present invention.

Other such devices are also known in the art and are disclosed in U.S. Pat. Nos. 4,601,598; 4,167,347; 4,035,089; 2,236,194; 2,180,560; 2,173,451; and 1,807,415. Known devices are also disclosed in the foreign patent art, by way of example German Patents 1,511,325; 2,157,175; and International Patent Application PCT/US/00002.

Finger gripping devices such as those disclosed in the above cited U.S. Pat. No. 4,932,800, generally provide a sleeve of compressible material for assembly with that portion of an article grasped by the user during finger manipulation of the article. The basic function assigned to the device is to deform on application of gripping pressure and to at least partially assume the shape of the gripping fingers during manipulation of the article by the user. In general, the device is sufficiently resilient to recover its original shape shortly after removal of gripping pressure. Many of the finger gripping devices that are known have received acceptance in the marketplace, and have provided the consumer with an improved writing device when combined with a writing instrument such as a pen or pencil. However, while the various gripping devices which are installed over the surface portion of the article to be manipulated are generally simple to manufacture, a need arises for a finger gripping device which may either be incorporated within the structure of the article to be manipulated, or as a separate unit, as desired by the manufacturer. As is evident, the incorporation of the gripping device in the structure of the article would tend to produce a thinner and less bulky gripping area, particularly when incorporated into a writing instrument.

It is therefore an object of the present invention to provide a compressible finger gripping device which is simple to manufacture and easily assembled onto a writing instrument or the like.

A second object of the invention is to provide a writing instrument employing a manual gripping device adjacent the writing point which provides increased comfort and decreased fatigue during use of the writing instrument.

Still another object of the invention is to provide a compressible finger gripping device which is adaptable for incorporation into the structure of a writing device or may be manufactured as a separate unit for assembly onto the structure of the writing device.

A further object of the invention is to provide a finger gripping device of the type employable with a writing instrument, which is simple to manufacture and inexpensive, being adaptable to mass production techniques.

SUMMARY OF THE INVENTION

The above objects and other objectives which will become apparent as the description proceeds are accomplished by providing a writing instrument having a cylindrical barrel assembly with means for retaining a writing medium disposed at one end. A resilient portion of the barrel assembly is disposed adjacent to the barrel on one end and terminates at the retaining means. A unitary tubular sleeve envelopes the barrel resilient portion whereby the tubular sleeve and the barrel resilient portion combine to provide a compressible finger grip to the user of the writing instrument during operation.

Generally, the resilient portion of the barrel assembly comprises an elongated tube having a plurality of elongated slots formed therein, the slots extending axially with respect to the cylindrical barrel assembly over substantially the entire length of the tube. Thus, the elongated slots form a plurality of flexible beams which bend to provide the resilience necessary to enable compression by the fingers of the user.

The writing instrument may be fabricated with the cylindrical barrel having the slots formed therein connecting the means for retaining the writing medium to the remainder of the cylindrical barrel or, in the alternative, the writing instrument may have the means for retaining the writing medium connected to the barrel by a cylindrical support member over which the elongated tube having a plurality of elongated slots and the unitary tubular sleeve enveloping the tube are assembled with a support member being disposed in inner spaced relation with the elongated tube.

BRIEF DESCRIPTION OF THE DRAWING

The foregoing and other features of the invention will be more particularly described in connection with the preferred embodiment, and with reference to the accompanying drawing, wherein.

DESCRIPTION OF THE PREFERRED EMBODIMENT

Figures 1, 2:
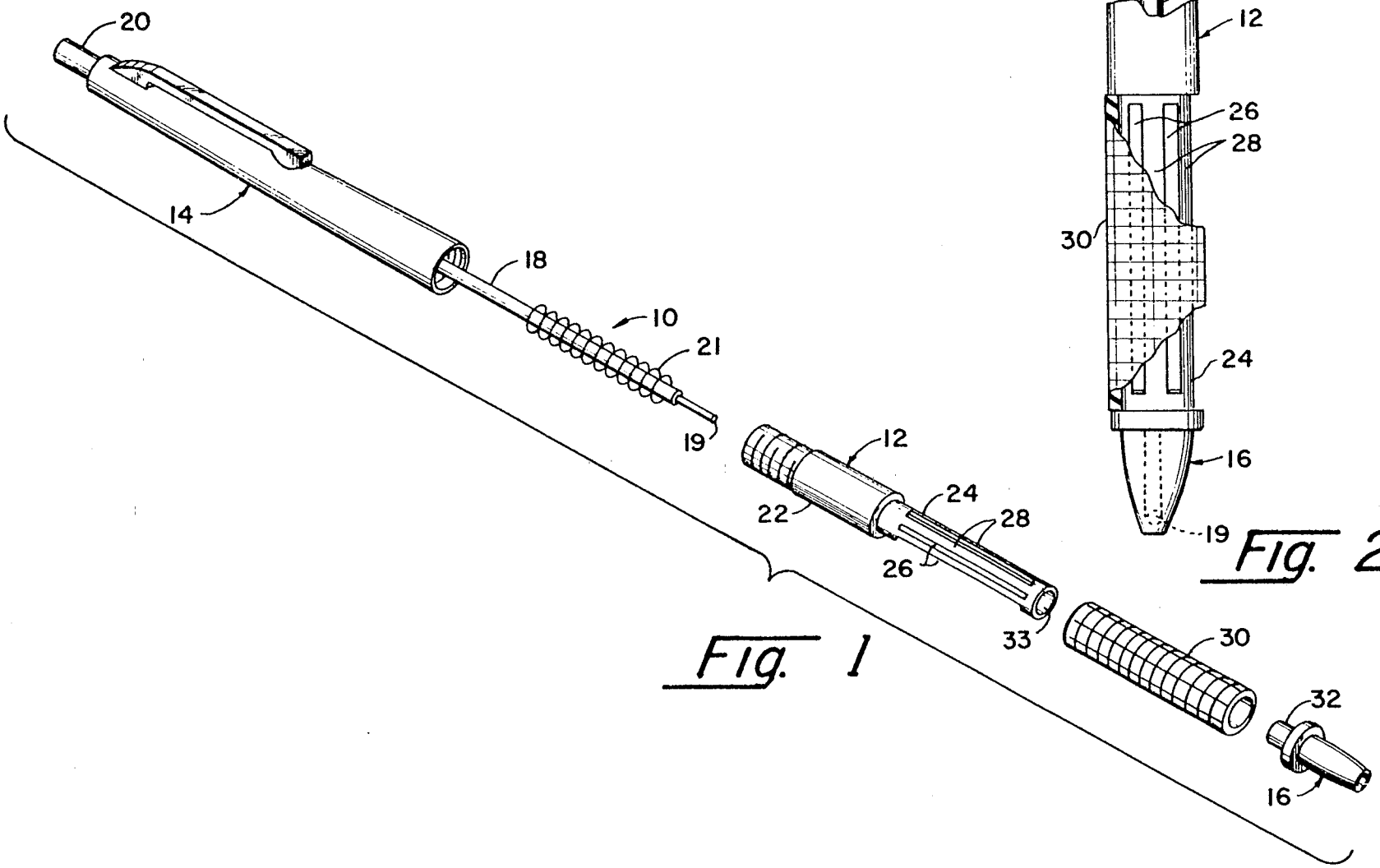
FIG. 1 is an exploded perspective view showing a writing instrument constructed in accordance with the teachings of the present invention.
FIG. 2 is a fragmentary elevational view showing details of a portion of the structure of FIG. 1 taken on an enlarged scale for clarity.

Referring now to the drawing and in particular to FIGS. 1 and 2, there is shown a writing instrument 10 of the ball point pen type which comprises a barrel assembly 12, cap 14 and means for retaining a writing medium in the form of a barrel tip 16.

The writing instrument 10 contains a writing medium of the type well known in the art in the form of an ink containing element 18 having a ball point 19 at one end and the opposite end thereof mechanically connected to a button 20 extending from the cap 14. A spring 21 is provided to retract the ink containing element 18 rearwardly into the barrel assembly 12, and consequently the ball point 19 into the barrel tip 16 when the button 20 is released and the writing instrument is not in use.

The cap 14 is threadably received onto the rearward portion of the barrel assembly 12 with the ball point 19 retained within the barrel tip 16.

The ink containing element 18, ball point 19, and cap 14 are similar to those assemblies well known in the art, and therefore will not be further described with reference to the present embodiment.

The barrel assembly 12 comprises a cylindrical rear portion 22 having threads formed thereon for receiving the cap 14, and a resilient cylindrical portion 24 which may be fabricated separately and attached by force fit into the rear portion 22, or may be formed of a unitary structure with the rear portion, only of a lesser diameter. As is evident, the resilient cylindrical portion 24 is in the form of a relatively thin wall tube and is provided with a plurality of elongated slots 26 formed over substantially the entire length of the tube. The formation of the slots 26 is effective to produce a plurality of flexible beams 28 which are compressible inwardly of the barrel assembly 12.

The resilient cylindrical portion 24 in the final assembly of the writing instrument 10 is disposed in close fitting engagement with a cylindrical tubular sleeve 30 of a rubber or thermoplastic material. The sleeve 30 has on its outer surface a pattern which may be of any design well known in the art which is effective to prevent slippage of the user's fingers during operation of the writing instrument 10.

Figures 3, 4:
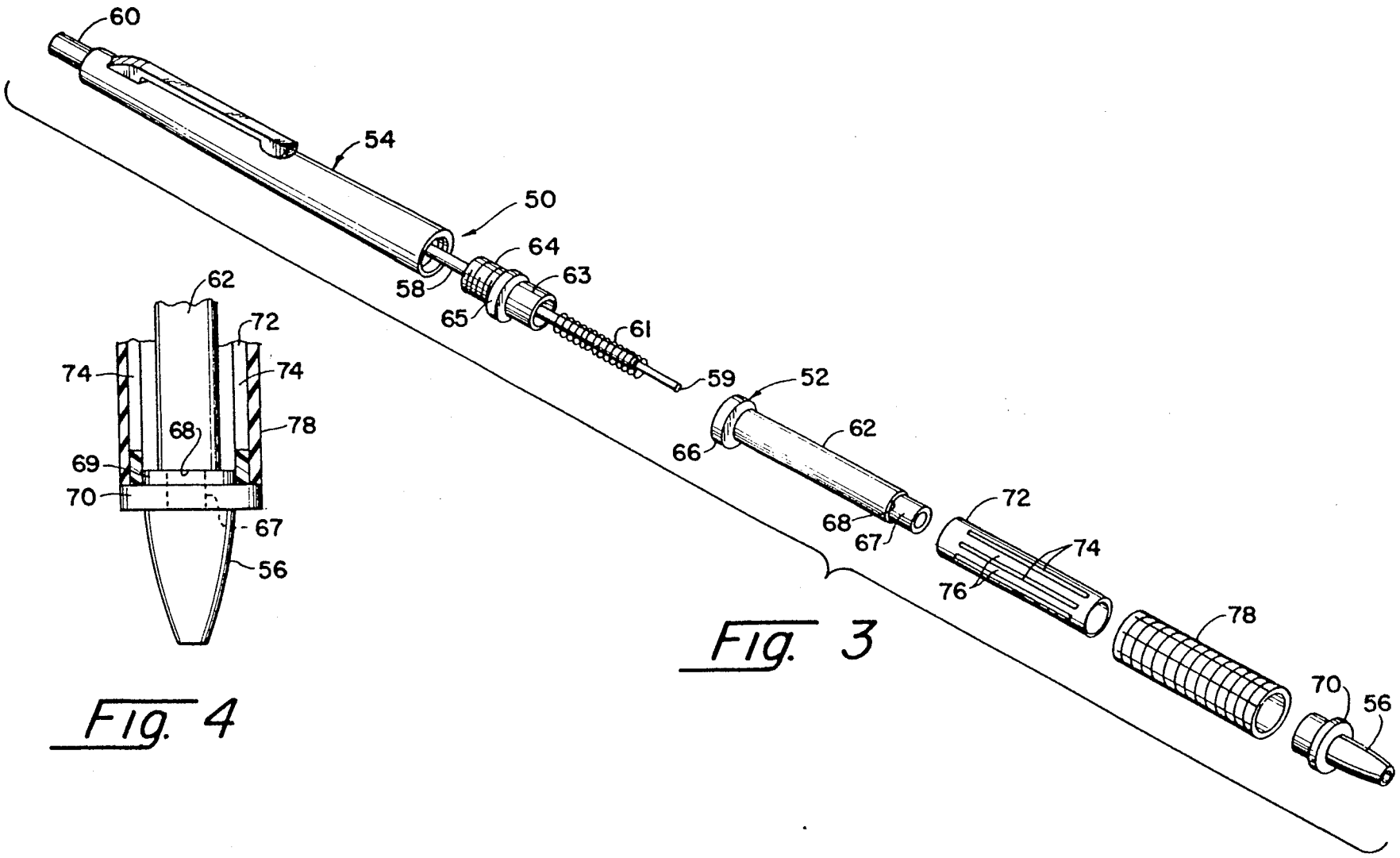
FIG. 3 is an exploded view similar to FIG. 1 showing an alternate construction employing the teachings of the present invention.
FIG. 4 is a sectional elevational view showing details of a portion of the structure of FIG. 3 taken on an enlarged scale for clarity.

In assembling the writing instrument 10, the tubular sleeve 30 is placed over the resilient cylindrical portion 24 and the barrel tip 16 is provided with a rearwardly extending cylindrical boss 32 which is received as a force fit into a front opening 33 in the resilient cylindrical portion 24 of the barrel assembly 12. The ink containing element 18 and the cap 14 are now placed onto the barrel assembly 12 and the writing instrument assembly is complete and ready for use. Referring now to FIGS. 3 and 4, there is shown an alternate embodiment of the invention wherein a writing instrument 50 comprising a barrel assembly 52, a cap 54 and a barrel tip 56.

An ink containing element 58 terminating in a ball point 59 is disposed at the rearward end of the writing instrument 50 and a button 60 is employed to advance and retract the ink containing element 58 against a spring 61 during employment of the writing instrument.

As in the previous embodiment, the ink containing element 58, ball point 59 and spring 61 are similar to those well known in the art which are activated by a mechanism such as the button 60 contained on the cap 54. These elements will therefore not be discussed more in detail as they do not provide an integral part of the present invention.

The embodiment of the invention depicted in FIGS. 3 and 4 primarily differs over that structure shown in FIGS. 1 and 2 in that the barrel assembly 52 comprises a cylindrical support member 62 of substantially rigid material having an opening at the rearward end thereof which is force fit over the forward outer surface 63 of a cylindrical rear portion 64 of the barrel assembly 12, or in the alternative the support member 62 and rear portion 64 may be molded as one piece. The cylindrical rear portion 64 has a radially outwardly extending flange 65 and the support member 62 has a radially outwardly projecting flange 66 which is of lesser diameter than the flange 65. The support member 62 is received onto the cylindrical rear portion 64 until the two flanges 65 and 66 are in abutting relation, as best shown in FIG. 4.

A forward end 67 of the support member 62 is of a reduced diameter producing a shoulder 68 and the forward end 67 is dimensioned such that it is force fit in the rear opening of the barrel tip 56, the barrel tip 56 being received onto the forward end to rest against the shoulder 68.

As will be noted in FIG. 4, the barrel tip 56 has a radially outwardly extending flange 70 of substantially the same diameter as the flange 65 disposed on the support member 62 and a cylindrical boss 69 of substantially the same diameter as the flange 66. Thus, in the present embodiment, the cylindrical rear portion 64, the cylindrical support member 62 and the barrel tip 56 are assembled in a manner described above, and the ink containing element 58 and cap 54 may be included in the assembly at this point.

To complete the structure and provide a resilient finger grip, a resilient tube 72 is provided, similar in construction to the resilient cylindrical portion 24 of the embodiment shown in FIGS. 1 and 2. The resilient tube 72 has a plurality of elongated slots 74 extending substantially over the entire length of the tube and forming a plurality of resilient beams 76. However, unlike the previously described embodiment of FIGS. 1 and 2, the resilient tube 72 is forced into a tubular sleeve 78 add the assembled tube and sleeve are then forced over the flanges 70 and 66 to form a structure as shown in FIG. 4. It should be noted that with the tube 72 and sleeve 78 in place as shown in FIG. 4, the combination is in spaced relation with the support member 62, allowing for flexure of the combination when gripped by the user.

In the present construction, the resilient cylindrical portion 24 and the resilient tube 72 are both constructed of an acetal material such as that sold under the trademark DELRIN by E. I. Dupont, and the slots 26 and 74 respectively are six in number to provide adequate flexure when combined with the tubular sleeve 30, or the tubular sleeve 78. The tubular sleeves 30 and 78 are generally formed of an injection molded rubber material and provide a substantially tight fit onto the cylindrical portion 24 or the resilient tube 72. Thus, the combination of the two elements allows control over the flexibility of the gripping surface in that the beams 28 or 76 are flexed substantially radially inwardly when pressure is applied by the fingers of the user. It should also be evident that while the structure shown in FIGS. 1 and 2 provides a substantially rigid writing instrument 10, should the requirements be such that more rigidity be obtained in the barrel assembly 12 of the writing instrument, one may turn to the embodiment shown in FIGS. 3 and 4 in which the rigidity of the barrel assembly 52 is not compromised by the flexibility of the resilient tube 72 and the tubular sleeve 78, the elements forming only a gripping surface. The writing instrument 50 therefore may be constructed having more flexibility in the gripping surface than if the embodiment of FIGS. 1 and 2 be employed.

While it is apparent that modifications and changes may be made within the spirit and scope of the present invention, it is my intention, however, only to be limited by the scope of the appended claims.

As my invention, I claim:

1. A writing instrument comprising:

a cylindrical barrel assembly having means for retaining a writing medium disposed at one end thereof;

a resilient portion of said barrel assembly disposed adjacent said barrel one end and terminating at said retaining means; and a unitary tubular sleeve enveloping said barrel resilient portion;

said resilient portion comprising a thin wall elongated tube formed of a pair of bands having a continuous circumferential surface disposed one at each end thereof and a plurality of elongated slots formed thereon extending axially with respect to said cylindrical barrel assembly between said bands, whereby said tubular sleeve and said barrel resilient portion combine to provide a compressible finger grip to the user of the writing instrument during operation.

2. A writing instrument as set forth in claim 1 wherein said resilient portion of said tubular sleeve is fabricated of an acetal material.

3. A writing instrument as set forth in claim 1 wherein said plurality of slots consists of six slots equally spaced around the circumference of said elongated tube.

4. A writing instrument as set forth in claim 1 wherein said tubular sleeve is fabricated of a rubber material.

5. A writing instrument as set forth in claim 1 wherein said means for retaining a writing medium is solely supported by said resilient portion of said barrel assembly.

6. A writing instrument as set forth in claim 1 wherein said barrel assembly further comprises a cylindrical support member of lesser diameter than said resilient portion of said barrel assembly, said support member being disposed in inner spaced relation with said barrel assembly resilient portion and equally spaced therefrom over the entire length thereof to provide support for said means for retaining a writing medium.

7. A writing instrument as set forth in claim 6 wherein said plurality of slots consists of six slots equally spaced around the circumference of said elongated tube.

8. A writing instrument as set forth in claim 7 wherein said resilient portion of said barrel assembly is fabricated of a acetal material.

9. A writing instrument as set forth in claim 8 wherein said tubular sleeve is fabricated of a rubber material.

10. A writing instrument as set forth in claim 7 wherein said means for retaining a writing medium is solely supported by said resilient portion of said barrel assembly.

11. A method of fabricating a writing instrument having a cylindrical barrel assembly with a means for retaining a writing medium disposed at one end thereof which includes the steps of:

providing an elongated tube having a plurality of elongated slots formed therein over substantially the length of the tube to form a plurality of resilient beams;

placing said elongated tube within a tubular sleeve having an internal diameter providing contact engagement with the external surface of said elongated tube; and sliding said elongated tube and said tubular sleeve over said means for retaining a writing medium to a point on said barrel assembly where said elongated tube is radially spaced from said barrel assembly.

12. A method as set forth in claim 11 wherein said elongated tube is fabricated of an acetal material.

13. A compressible finger gripping device for assembly onto a cylindrical barrel of a finger manipulated article, said device comprising:

a thin wall elongated tube formed of a pair of bands having a continuous circumferential surface disposed at each end thereof and a plurality of elongated slots formed thereon extending axially with respect to said cylindrical barrel between said bands to form a plurality of resilient beams; and a unitary tubular sleeve enveloping said elongated tube whereby said elongated tube and said tubular sleeve combine to provide a compressible finger grip to the user of the finger manipulated article.

14. A compressible finger gripping device as set forth in claim 13 wherein said elongated tube is fabricated of a acetal material.

15. A compressible finger gripping device as set forth in claim 13 wherein said plurality of slots consists of six slots equally spaced around the circumference of said elongated tube.

* * * * *